United States Patent Office 3,307,911
Patented Mar. 7, 1967

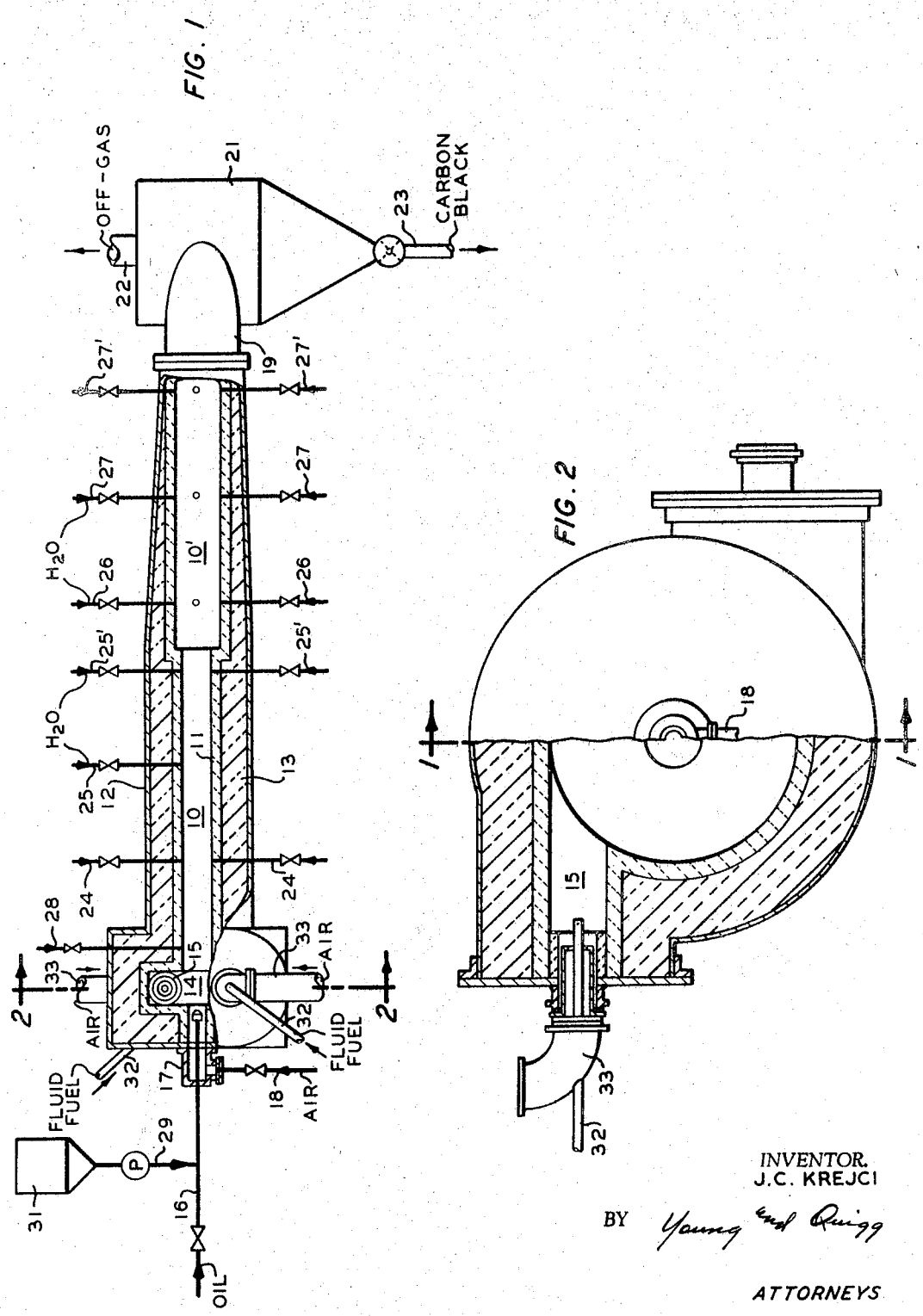

3,307,911
PRODUCTION OF CARBON BLACK
Joseph C. Krejci, Phillips, Tex., assignor to Phillips Petroleum Company, a corporation of Delaware
Filed June 28, 1962, Ser. No. 206,087
9 Claims. (Cl. 23—209.4)

This invention relates to the production of carbon black. In one aspect this invention relates to the production of furnace carbon blacks having lower than normal modulus properties in rubber.

For several years carbon black has been produced in large quantities in furnaces. The larger part of the carbon black produced today is used as a reinforcing agent for rubber. By far the large part of the compounded rubber material containing carbon black is designed specifically for tire treads or tire carcasses. The state of this rubber compounding art has advanced to such a degree that the quality of the carbon black used in such compounding must be controlled within narrow limits. Such a control of all of the desired properties of the carbon black is oftentimes difficult to achieve.

In controlling the quality of carbon blacks which are to be compounded into rubber, one of the most important properties is the modulus of the finished rubber product. Strictly speaking, "modulus" is not a property of the carbon black itself. However, it is common in the art to refer to "high modulus" carbon black, "low modulus" carbon black, and "normal modulus" carbon black as if "modulus" were a property of the carbon black itself. Generally speaking, furnace carbon blacks are usually considered to be either "normal modulus" or "high modulus" depending upon the modulus value of the particular carbon black being considered. On the other hand, channel blacks are generally considered to be "low modulus" carbon blacks.

Despite the widespread and increasing use of furnace blacks in applications formerly served by channel blacks there are some uses for which channel blacks are still regarded as superior by some persons skilled in the art. For example, in reinforcing natural rubber products and in specfic applications, for example, in non-squeal, soft-riding tires, the low modulus of the channel blacks makes them particularly desirable for such uses. It is thus desirable to furnish the art with a furnace black having properties, particularly modulus properties, comparable to those of channel black. This is particularly so in view of the fact that channel blacks are gradually increasing in cost and being priced out of the market due to increasing cost of the raw natural gas materials from which they are made. The present invention provides such a furnace black which, since it has a low modulus as compared to carbon blacks normally produced by a furnace process, is designated herein as a modified furnace black or one having a lower than normal modulus property when compounded in rubber.

It has recently been discovered that furnace carbon blacks having modulus properties in rubber comparable to those of channel carbon black can be produced by introducing into the reaction zone or section of a carbon black producing furnace a substance comprising an alkali metal. However, furnace blacks produced in this manner are hard to process or compound into rubber. That is, when such a furnace black is added to a rubber in the compounding mill an excessively high power requirement or excessively long milling time is required to properly incorporate the black into the rubber.

I have now discovered a method whereby the above difficulties can be eliminated and whereby there is produced an easy processing furnace carbon black having modulus properties in rubber comparable to those of channel carbon black and which can thus be used to replace the more expensive channel black in many applications. This is accomplished by forming the furnace black in the presence of an amount of a substance comprising an alkali metal which is sufficient to only partially effect the desired reduction in modulus, and then maintaining the thus produced carbon black in the reaction section of the furnace under carbon black producing conditions for a period of time sufficient to effect the remainder of the desired reduction in modulus properties.

Thus, broadly speaking, the present invention resides in a process for making furnace carbon black by the thermal decomposition of a fluid hydrocarbon feedstock and adjusting the quality of at least one property of said carbon black by forming same in a carbon black producing furnace under carbon black producing conditions in the presence of a substance comprising an alkali metal which is present in an amount sufficient to obtain only a portion of said desired quality adjustment, and maintaining the thus produced carbon black in the reaction section of said furnace under said conditions for a period of time sufficient to obtain the remainder of said desired quality adjustment; and a carbon black product produced by said process.

An object of this invention is to provide valuable carbon blacks and methods of making the same. Another object of this invention is to provide a process for making a furnace carbon black having properties in rubber comparable to those of channel black and which can be used as a substitute for channel black in the compounding of rubber and other uses. Another object of this invention is to provide a process for producing a furnace carbon black having lower than normal modulus properties in rubber. Another object of this invention is to controllably lower the modulus properties in rubber of a furnace carbon black produced by the decomposition of a hydrocarbon in a carbon black furnace. Another object of this invention is to provide a process for making a furnace carbon black, from a given hydrocarbon feedstock, having lower modulus properties in rubber than would normally be produced from said hydrocarbon feedstock. Another object of this invention is to provide a process for regulating and controlling the properties of furnace carbon blacks so as to satisfy prescribed and predetermined requirements for the properties of said carbon blacks. Still another object of this invention is to provide a method for controlling and counteracting variations which exist or occur in the properties of hydrocarbons used as feedstocks in furnace carbon black processes, which variations would normally considerably modify the quality of the carbon black produced in said furnace carbon black process. Still another object of this invention is to provide a furnace carbon black product, made from a given hydrocarbon feedstock, having lower modulus properties in rubber than the carbon black normally produced from said hydrocarbon feedstock according to the methods of the prior art. Other aspects, objects, and advantages of the invention will be apparent to those skilled in the art in view of this disclosure.

Thus according to one embodiment of the invention, there is provided a process for producing a furnace carbon black product characterized by lower than normal modulus properties in rubber, which process comprises: charging a hydrocarbon feedstock to a carbon black producing furnace; producing carbon black by partially burning said feedstock under carbon black producing conditions in the reaction zone of said furnace in the presence of a substance comprising an alkali metal present in an amount sufficient to effect only a portion of said desired decrease in modulus properties; maintaining said thus produced carbon black in said reaction zone under said carbon black producing conditions for a period of time sufficient to effect the remainder of said desired decrease in modulus properties; and recovering said carbon black product from the effluent from said furnace.

It will be noted that the invention thus comprises a combination process wherein there is first produced a carbon black by thermally decomposing a hydrocarbon feedstock in a carbon black producing furnace under carbon black producing conditions in the presence of an amount of a substance comprising an alkali metal sufficient to only partially obtain the desired adjustment in quality, e.g., decrease in modulus properties of the carbon black, and then maintaining the thus produced carbon black in the reaction section of said furnace for a period of time sufficient to effect the remainder of said desired adjustment in quality, e.g., decrease in modulus properties. This period of time is longer than that necessary to produce a tar-free carbon black.

Further according to the invention, there is provided a carbon black product which is produced in accordance with the process described in the preceding paragraph.

The actual modulus value imparted to a rubber by a given carbon black will depend upon the type of rubber into which the carbon black is compounded. For example, a given carbon black will impart different modulus values, per se, to natural rubber and to synthetic rubber when blended therein. However, generally speaking, a carbon black which will impart a high, a normal, or a low modulus value to natural rubber will also impart a high, a normal, or a low modulus value to synthetic rubber. For example, commercially available furnace carbon blacks, depending upon the feedstocks from which they are made, when blended in natural rubber usually impart to said rubber a "normal" 300 percent modulus value in the range of 1600 to 2200 p.s.i. In some synthetic rubbers, e.g., SBR–1000, the corresponding "normal" 300 percent modulus values are in the order of 1200 to 1600 p.s.i. However, some persons in the art may consider these values high, particularly the upper end of said ranges, depending upon the particular use to be made of the compounded rubber. For a typical channel black, such as the easy processing channel black used for comparison in Table I–B below, the "normal" 300 percent modulus value in natural rubber is in the order of 1200 to 1600 p.s.i., and in some synthetic rubbers, e.g., SBR–1000, is in the order of 800 to 1200 p.s.i.

The furnace carbon blacks produced in accordance with the invention are characterized by lower than normal modulus properties in rubber, i.e., said carbon blacks impart values to rubber which are lower than what would normally be expected from a furnace carbon black produced from the feedstock used. The feedstock may be one that in the absence of this invention usually yields a high modulus carbon black, or the feedstock may be one that usually yields a normal modulus carbon black. It is also within the scope of the invention to produce lower than normal modulus furnace blacks from feedstocks which usually yield what is generally considered a low modulus carbon black. In any event, the carbon black produced in the practice of the invention is characterized by a lower modulus in rubber than would be expected to be produced from the feedstock being used.

Thus, herein and in the claims, unless otherwise specified, the term "lower than normal modulus" when applied to a furnace carbon black, refers to a carbon black which when compounded in rubber imparts a modulus property to said rubber which is lower than woud be expected for a carbon black produced from the particular feedstock being used.

The substance comprising an alkali metal which is used in the practice of the invention can be any of the alkali metals sodium, potassium, lithium, rubidium, cesium, and francium, or mixtures thereof. Since said alkali metals are effective in any form whatsoever, they can be used in elementary form or in chemically combined form, e.g., chemical compounds either inorganic or organic. The only essential requirement is that said substance comprising an alkali metal be present in the reaction zone or section when the carbon black is formed. Said substance comprising an alkali metal can be introduced into the reaction section of the carbon black furnace in any form, e.g., solid, liquid or vapor. Said alkali metal substance can be dissolved or suspended in a carrier such as water or other aqueous media, organic media including solvents and the hydrocarbon raw material from which the black is to be made, or suspended in vapors or gases such as the combustion air or fuel gases which are burned in the furnace in order to supply the heat necessary for the thermal or pyrolytic decomposition of the hydrocarbon feedstock.

Examples of inorganic alkali metal containing compounds which can be utilized in the practice of the invention include, among others, the following: the chlorides, the sulfates, the nitrates, the carbonates, the bromides, the iodides, etc.

Examples of "organic" alkali metal containing compounds which can be utilized in the practice of the invention include, among others, the following: the acetates, the naphthenates, the oleates, the lanolates, salts of organic acids including fatty acids, the metal alkyls, etc.

Connate or naturally occurring alkali metal containing materials, such as occur in some petroleum crude oils, are also included within the scope of the invention.

The amount of the above-described alkali metal materials introduced into the reaction section of the carbon black producing furnace can vary within rather wide limits depending upon the exact nature of the carbon black forming reaction being utilized, the particular metal being utilized, the properties of the hydrocarbon feedstock being utilized, and the desired amount of quality adjustment or control desired in the carbon black product. In the practice of this invention only a portion of the desired quality control or adjustment, e.g., lowering of modulus, is effected by forming the carbon black in the presence of said alkali metal substance. As explained hereinafter, this is done in order to obtain an easy processing furnace carbon black. Thus, the amount of said alkali metal substance used in the practice of the invention is always less than what would normally be used when all of the quality control or adjustment is to be effected by forming the carbon black in the presence of said alkali metal material. Generally speaking, it is usually desired to use an amount of said substance comprising an alkali metal which will effect or obtain from at least about 25 percent but not more than about 75 percent of the desired quality control or adjustment.

Since the alkali metal itself is the effective component in the substances comprising an alkali metal, and since said metal is effective regardless of what it is combined with, it is more convenient to express the amounts used in the practice of the invention in terms of the metal itself. When using potassium, or a potassium containing substance or compound, the amount used will generally be in the range of from 1 to 200, preferably 2 to 100, more preferably 5 to 75, parts by weight of potassium per million parts by weight of hydrocarbon feedstock. Obviously, when the potassium is present in combined form the above figures are adjusted accordingly. For example, when using potassium chloride which is approximately 50 percent by weight potassium, the above ranges would be from 2 to 400, preferably 4 to 200, more preferably 10 to 150, parts per million by weight. It has been found that potassium, rubidium, cesium, and francium are more effective than sodium and lithium. For example, it has been found that potassium is about 10 times as effective as sodium and about 20 times as effective as lithium. Thus, when using sodium or lithium the above ranges based on potassium will be increased accordingly. Overall inclusive ranges for said alkali metals would be from 1 to 4000, preferably 2 to 2000, more preferably 5 to 1500, parts by weight of alkali metal per million parts by weight of hydrocarbon feedstock.

In the production of furnace carbon blacks in accordance with the prior art, it is desirable and customary to quench the carbon black forming reaction immediately after the carbon black which has formed has become free of tarry material, that is, when it has become a tar-free black as defined in commerce, which is when samples of the flocculent carbon black separated from the furnace effluent gases and collected as in separator 21 in the drawing have a photolometer value of at least 80, preferably 85 or greater, more preferably 90 or greater, before pelleting.

In the practice of this invention, the period of time for which the carbon black is maintained in the reaction section of the furnace under carbon black producing conditions is longer than that necessary to give a tar-free carbon black. In determining the residence time of the carbon black in the reaction section of the furnace, the residence time to the quench point for the production of a tar-free black, as defined above, is designated $T_1$. In the prior art, this would be considered the normal residence time. However, in the practice of this invention, the reaction is not quenched at the point where the black becomes a tar-free black, but the carbon black is maintained in the reaction section for a longer period of time to give a total residence time $T_2$. Thus, herein the increased residence time in the reaction section of the furnace can be expressed as a ratio $R=T_2/T_1$ where $T_2$ equals the total time to quench and $T_1$ equals the time to quench to give a tar-free carbon black. Usually the value of R will range from 1.5 to 9, preferably 2 to 6. Stated another way, in the practice of this invention the carbon black after formation is maintained in the reaction section of the furnace under carbon black producing conditions for a period of time which is from 1.5 to 9 times the period of time necessary to produce a tar-free carbon black. By thus increasing the residence time of the carbon black in the reaction section of the furnace, a change in curing characteristics of the carbon black is effected.

FIGURE 1 illustrates one form of apparatus which can be employed in the practice of the invention.

FIGURE 2 is a cross-section along the line 2—2 of FIGURE 1.

The invention is not limited to employing any particular type of carbon black furnace and/or apparatus in carrying out the method of the invention. For example, it is known in the prior art to produce carbon black by directing a hot oxidizing or combustion gas in a generally helical path adjacent the periphery of a generally cylindrical reaction zone and directing a reactant material axially into said zone inside the helically-moving mass of hot gas. The reactant is thereby rapidly heated to a carbon black-forming temperature, e.g., in the range 2200 to 3500° F., and reacted in said zone to form carbon black, which is subsequently recovered. Processes of this type are known as tangential flame processes and are illustrated in U.S. Patents 2,375,795; 2,375,796; 2,375,797; and 2,375,798 (1945). Another tangential flame type process is disclosed in U.S. Patent 2,564,700 (1951) which involves the injection of a combustible mixture of fuel and oxidizing gas circumferentially into a combustion zone and the reaction of the mixture by combustion near the periphery of said zone. The resulting combustion gas, at a high temperature, travels in a generally spiral path toward the axis of the combustion zone and is then directed in a generally helical path adjacent the periphery of a reaction zone which is contiguous with, of smaller diameter than, and in open communication with, said combustion zone. A carbonaceous reactant is directed along the common axis of said zones and is rapidly heated to a carbon black-forming temperature by virtue of heat directly imparted from the helically-moving combustion gas. The reactant is reacted within the reaction zone to form carbon black, which is subsequently recovered. This type of tangential flame process is known as a precombustion process, since the hot gas is substantially completely formed by combustion prior to contact with the reactant. The invention is not limited to being practiced in furnaces of the type described above. Other types of furnaces such as those illustrated in U.S. Patents Hanson 2,368,828; Miller 1,807,321; Wiegand et al. 2,378,055; Wiegand et al. 2,440,423; and Wiegand et al. 2,440,424 can also be employed.

The reaction mixture formed in a process of the type above described comprises a suspension of a carbon black in combustion gas. It is known in the prior art to withdraw such a mixture from the reaction zone and to cool the mixture suddenly by the direct injection thereinto of a cooling liquid, such as water, in order to cool the mixture suddenly to a temperature at which no further reaction can occur.

FIGURE 1 illustrates in diagrammatic form the general construction and the general shape of one presently preferred type of carbon black furnace, and associated apparatus, which can be employed in the practice of the invention. The furnace here illustrated is commonly known as a precombustion type furnace as discussed above. Referring now to said FIGURE 1, a reaction chamber or section having an upstream portion 10 and a downstream portion 10′ has a refractory lining 11 made of a high refractory material such as sillimanite, alumina, or other refractory material suitable for the purpose. A steel shell 12 containing insulating material 13 surrounds said refractory liner. The downstream end portion of said reaction section comprises an enlarged portion 10′ intended to provide increased residence time under carbon black producing conditions without unduly increasing the length of said reaction section. It is not essential that said downstream end portion 10′ have an enlarged diameter as shown and a furnace having a reaction section of the necessary increased length of constant diameter can be employed if desired. In one embodiment of the furnace here illustrated, the upstream portion 10 of the reaction section had an inner diameter of 12 inches and a length of 11 feet and the downstream portion 10′ had an inner diameter of 18 inches and a length of 10 feet. Since one foot of the 18 inch I.D. portion equals 2.25 feet of the 12 inch portion, the furnace could have been constructed to have a total length of 33.5 feet of 12 inch I.D. The combustion chamber 14 was 12 inches long and had a diameter of 37 inches. These dimensions are not critical, are merely given as an example, and any and all dimensions can be varied in the practice of the invention. However, when employing a precombustion type of furnace as illustrated the combustion chamber 14 should have a larger diameter than reaction section 10.

At the inlet end of the furnace there is a short section 14 having a diameter somewhat larger than the diameter of reaction section 10. This larger diameter section 14 is essentially a combustion chamber in which a combustible mixture of a gas, such as natural gas from conduits 32, and an oxygen containing gas, such as air from conduits 33, is burned. Said combustible mixture is injected into combustion chamber 14 through a pair of inlets 15 which are so positioned that the gases enter said combustion chamber 14 in a direction tangent to the cylindrical wall thereof. Upon continued injection of the combustible mixture, the flame and combustion products follow a spiral path toward the axis of the combustion chamber 14. When the spiral becomes less than the diameter of reaction section 10, the gaseous flow changes from a spiral to a helix, and following this latter pattern the gases enter said reaction section 10. If desired a liquid fuel can be introduced through conduits 32 instead of a gaseous fuel.

Reactant hydrocarbon gas or oil, from a source not shown, passes through a preheater, also not shown, and finally passes through feed conduit 16 which is arranged axially so that feed introduced therethrough will pass axially through the furnace. Surrounding said feed conduit 16 is a larger conduit 17, called an "air jacket." The arrangement of said conduits 16 and 17 defines an annular space through which it is intended to pass air, introduced from conduit 18, into the furnace. Air passing said annular space is referred to as "jacket air" and is intended to keep the inner end of feed conduit 16 cool to prevent the deposition of carbon thereon. Effluent gases containing carbon black suspended therein pass from the downstream end portion 10′ of the reaction section through conduit 19 into carbon black separating means 21, shown here as a cyclone, but which can be any usual form of apparatus for separating solids such as carbon black from gases. Gases from which the carbon black has been removed issue from said separation means 21 through conduit 22 and carbon black product passes through outlet conduit 23 to such disposal or further treatment as desired.

Provided along the length of reaction section 10 and 10′ are a plurality of quench liquid inlet conduits 24, 25, 25′, 26, 27, and 27′. Said quench liquid inlet conduits are provided for the introduction of quenching liquid, usually water in liquid phase, into the reaction section to quickly quench the reaction mixture gases to a temperature below that at which carbon black formation takes place, preferably to a temperature lower than 2000° F. Quench inlet conduits 26, 27, and 27′ each comprise four such inlets (three are shown) spaced 90° apart around the circumference of section 10′. Quench inlet conduits 24 and 25′ each comprise two such inlets spaced 180° apart around the circumference of section 10, whereas inlet 25 comprises only one inlet. Any number of inlets arranged in any suitable radial pattern can be employed. It is desirable to employ at least two inlets at each position in order to more effectively blanket the interior of the reaction section and thus more effectively quench the reaction. Each of said inlets is equipped with a suitable spray nozzle (not shown) at the inner end thereof. Said quench liquid inlet conduits can be located at any desired points along the length of the reaction section. The furnace can be provided with any desired number of said quench inlet conduits arranged in any desired spacing. As explained further hereinafter, the particular quench inlet conduit employed will depend upon the amount of quality control or adjustment desired in the carbon black product in accordance with the invention.

In the practice of the invention, the substance comprising an alkali metal can be introduced into the reaction section of the furnace along with the hydrocarbon feed in conduit 16, with the tangential fuel mixture through inlet port 15, or directly into combustion section 14 or directly into reaction section 10 of the furnace through a suitable conduit 28 which is shown in FIGURE 1 as entering reaction section 10. When said alkali metal material is utilized in the form of a solid such as a powdered metal containing compound, or as a finely divided metal, it can be uniformly dissolved, dispersed, or suspended directly into the hydrocarbon feed in suitable mixing apparatus, not shown, and the resulting solution, dispersion, or suspension then introduced along with the feed through conduit 16. Said finely divided solid can also be dispersed or suspended in a carrier which can then be uniformly dispersed in the hydrocarbon feed by introduction through conduit 29 from storage vessel 31. Said storage vessel 31 can also be used for the preparation of solutions of those alkali metal materials which are water soluble, or which are soluble in organic solvents such as alcohols, ethers, acetone, etc. Any suitable solvent can be used for this purpose. Said solutions can then be introduced through conduit 29 into feed conduit 16. It will be understood that any of the various described forms of the substance comprising an alkali metal can also be introduced via a suitable conduit such as conduit 28, by means of suitable apparatus connected thereto, directly into reaction section 10 or directly into combustion section 14. Since it is essential that the alkali metal additive be present at the time the carbon black is formed, it is preferred that when it is introduced directly into reaction section 10 it is so introduced immediately after the inlet to said chamber 10.

Since the substance comprising an alkali metal is normally used in relatively low concentrations, it is usually advantageous to introduce same in as highly diluted or extended form as practical so as to facilitate maintaining a uniform addition rate and level of concentration. Thus, it is preferred to introduce said alkali metal material in the form of dilute aqueous solutions or similarly dilute organic solvent solutions, or in the form of organic or aqueous emulsions which can be uniformly dispersed in the hydrocarbon feed. The most preferred forms of the substance comprising an alkali metal are the water soluble compounds, or compounds which are soluble in an organic solvent or are directly soluble in the hydrocarbon feedstock.

The following examples will serve to further illustrate the invention.

EXAMPLES

A series of runs were made in which a preheated aromatic concentrate oil was introduced axially into a carbon black furnace essentially like that illustrated in the drawings and having the following dimensions. The combustion chamber 14 was 12 inches long and had a diameter of 37 inches. The upstream portion 10 of the reaction section was 12 inches in diameter and 11 feet long. The downstream portion 10′ of the reaction section was 18 inches in diameter and 10 feet long.

In all of the runs set forth in these examples the operating conditions were maintained as nearly identical as possible for comparative purposes. In all of the runs the tangential air rate was 225 M c.f.h., the tangential gas rate was 15 M c.f.h. and the jacket air rate was 4 M c.f.h. The aromatic concentrate oils used in the runs were conventional commercial feedstocks which had been prepared in known manner by liquid sulfur dioxide extraction of cycle oils obtained in the catalytic cracking of gas oils. Said oils had the properties set forth in Table I–A below:

TABLE I–A.—OIL FEEDSTOCKS

| Property | Charge Stock | |
|---|---|---|
| | A | B |
| Gravity, ° API | 11.0 | 10.8 |
| Vac. Dist. ° F. at 760 mm. Hg: | | |
| First Drop | 470 | 464 |
| 5% | 558 | 553 |
| 10% | 587 | 591 |
| 20% | 611 | 616 |
| 30% | 639 | 648 |
| 40% | 660 | 668 |
| 50% | 681 | 689 |
| 60% | 711 | 705 |
| 70% | 761 | 737 |
| 80% | 820 | 787 |
| 90% | 867 (82%) | 898 |
| BMCI | 90.4 | 90.5 |
| Viscosity: | | |
| SUS at 100° F | 81.9 | 75.7 |
| SUS at 210° F | 37.6 | 35.1 |
| Carbon, wt. percent | 88.8 | 89.1 |
| Hydrogen, wt. percent | 9.5 | 9.5 |
| Sulfur, wt. percent | 1.29 | 1.25 |
| Carbon Residue, Ramsbottom, wt. percent | 1.61 | 1.00 |
| BS&W, vol. percent | 0.17 | 0.06 |
| Pour Point, ° F | 45 | 45 |

In some of the runs the carbon black was produced in the absence of any added material comprising an alkali metal and without any increase in residence time beyond that necessary to produce a tar-free carbon black (90 photelometer in these examples). In other runs, the carbon black was produced in the presence of a substance comprising an alkali metal but again in the absence of any increase in residence time beyond that necessary to produce a tar-free carbon black. In other runs, the substance comprising an alkali metal was omitted but the residence time of the carbon black in the reaction section of the furnace was increased beyond that necessary to produce a tar-free carbon black. In still other runs, in accordance with the invention the carbon black was produced in the presence of a substance comprising an alkali metal and was then subjected to an increased residence time beyond that necessary to produce a tar-free carbon black. Operating conditions not already set forth above, yields of carbon black, and tests on the carbon black product are set forth in Table I–B below.

Samples of said carbon black products were compounded with natural rubber according to ASTM D-1419–58T to produce a series of rubber compositions. The compounding recipe employed in preparing said rubber compositions was as follows:

| | Parts by weight |
|---|---|
| #1 Smoked sheet | 100 |
| Carbon black | 40 |
| Stearic acid | 3 |
| Zinc oxide | 5 |
| Altax [1] | 0.6 |
| Sulfur | 2.5 |

[1] Benzothiazyl disulfide.

Said rubber compositions were each cured to a finished rubber by curing at 293° F. for 30 minutes. The cured rubber compositions were tested in accordance with standard rubber testing procedures as set forth hereinafter. Tests on said cured rubber compositions are also set forth in Table I–B below.

For comparison purposes a sample of a commercially available easy processing channel black was compounded into a sample of the same natural rubber used in preparing the rubber compositions using the experimental carbon blacks from the above-described examples. The rubber composition containing said channel black was cured and tested in the same manner as said other rubber compositions.

greater than 1. However, since $T_1$ was not determined in this run, $T_2/T_1$ is reported as 1+.

In Runs 3, 4, and 7, the quench water inlet was positioned 6.0 feet from the entrance to downstream portion 10' of the reaction section. Since downstream portion 10' of the reaction section was 18 inches I.D. compared to 12 inches I.D. for upstream portion 10 of the reaction section, one foot of downstream portion 10' of the reaction section is equivalent to 2.25 feet of upstream portion 10 of the reaction section. Therefore, the total effective length of the reaction section up to the quench water inlet was 11 feet of upstream portion 10 plus 13.5 feet of downstream portion 10', or 24.5 feet. From Runs 1 and 2 it was known that 4.38 feet of the reaction section was necessary to give a carbon black product having a photelometer value of 90. Therefore, the ratio R for said Runs 3, 4, and 7 is $R=T_2/T_1=24.5/4.38=5.6$.

In the above runs the comparison of residence times was based on the volume of the reaction section. This is possible because in all of said runs the amount of gas and air introduced into the furnace was the same and the axial oil feed was essentially the same. However, the residence times in the reactor can be varied in two ways (1) by changing the volume of the reaction section, i.e., moving the quench water inlet point and (2) changing the air to oil feed ratio. In Runs 5 and 6 the residence time in the reaction section was increased by decreasing the oil feed rate. The location of the quench water inlet point was the same as in Runs 3, 4, and 7 giving the same volume of reaction section. From previous runs and experience with the aromatic oil feedstock used in these runs it was estimated that the length of reaction section necessary to produce a 90 photelometer black was 3 feet for Run 5 and 2 feet for Run 6. Thus, calculating the ratio R in the same manner as above, for Run 5 we have $R=T_2/T_1=24.5/3=8.1$, and for Run 6 we have $R=T_2/T_1=24.5/2=12.2$.

Referring again to Table I–B and comparing the carbon

TABLE I–B.—PRODUCTION OF CARBON BLACK

| | Run Number | | | | | | | | EPC Channel Black |
|---|---|---|---|---|---|---|---|---|---|
| | 1 | 2 | 3 | 4 | 5 | 6 | 7 | 8 | |
| Oil Charge: | | | | | | | | | |
| Identification No | A | A | B | A | B | B | A | A | |
| Added KCl content, p.p.m | 0 | 50 | 0 | 50 | 0 | 0 | 15 | 150 | |
| Furnace Operating Conditions: | | | | | | | | | |
| Oil feed rate, gal./hr | 250.2 | 250.5 | 250.1 | 249.8 | 210.4 | 175.9 | 250.5 | 253.0 | |
| Oil preheat temp., °F | 780 | 775 | 780 | 775 | 780 | 780 | 780 | 780 | |
| Reaction section length, feet | 4.38 | 4.38 | *11+6 | *11+6 | *11+6 | *11+6 | *11+6 | 4.00 | |
| Ratio of Residence Times, $T_2/T_1$ | 1.0 | 1.0 | 5.6 | 5.6 | 8.1 | 12.2 | 5.6 | 1+ | |
| Carbon Black Product: | | | | | | | | | |
| Yield, lb./gal | 3.29 | 3.21 | 3.40 | 3.22 | 2.81 | 2.30 | 3.19 | 3.39 | |
| Photelometer | 90 | 90 | 100 | 100 | 100 | 100 | 100 | 94 | |
| $N_2$ Surface Area, sq. m./g | 118.7 | 121.4 | 150.2 | 145.2 | 192.0 | 266.5 | 148.5 | 125.4 | 114.0 |
| Oil absorption, cc./g | 1.33 | 0.96 | 1.50 | 0.92 | 1.42 | 1.41 | 1.08 | 0.85 | 0.9 |
| pH | 9.85 | 9.85 | 9.7 | 8.8 | 8.9 | 7.1 | 9.5 | 9.5 | 4.5 |
| Evaluation of Carbon Black Product in Rubber: | | | | | | | | | |
| Compounded Mooney, ML-4 at 212° F | 75.2 | 74.2 | 73.8 | 75.6 | 76.8 | 79.8 | 77.0 | 77.2 | 79.2 |
| 300% Modulus, p.s.i | 1,840 | 1,460 | 1,640 | 1,150 | 1,420 | 1,140 | 1,320 | 1,140 | 1,270 |
| Tensile, p.s.i | 4,260 | 4,660 | 4,400 | 4,570 | 4,270 | 4,170 | 4,310 | 4,560 | 4,320 |
| Elongation, percent | 520 | 590 | 580 | 620 | 620 | 590 | 620 | 600 | 610 | 620 |
| Crosslinking, $v \times 10^4$, mols/cc | 1.60 | 1.51 | 1.46 | 1.34 | 1.23 | 0.94 | 1.42 | 1.45 | 1.25 |

*11' of upstream portion 10 plus 6' of downstream portion 10' (see Figure 1).

Referring to Table I–B above, the ratios of residence time there given were determined in the following manner. In Runs 1 and 2 the quench water inlet employed was positioned 4.38 feet from the inlet end of reaction section 10. Since the carbon black product from these runs had a 90 photelometer value, $T_1$ and $T_2$ are both the same and the ratio $R=T_2/T_1=1.0$.

In Run 8 the quench water inlet was positioned 4.0 feet from the inlet end of reaction section 10. Thus $T_2=4.0$. The carbon black product had a photelometer value of 94 showing that $T_1$ was slightly less than 4 and $T_2/T_1$ is black product from Runs 1, 2, and 8 with the easy processing channel black control shows it is necessary to add 150 parts per million by weight of KCl to the hydrocarbon feedstock in order to obtain a furnace carbon black having properties in rubber comparable to the channel black. However, the furnace black from Run 8 was hard to process into the rubber and required excessive power requirements to incorporate same in the rubber.

In contrast, comparing the carbon black product from Run 4 with the carbon black product from said Runs 2 and 8 shows that when using only 50 parts per million by weight of potassium chloride, i.e., only a portion of the amount used in Run 8, and effecting further quality control and modification of the carbon black product by increasing the residence time in the reaction section in accordance with the invention, there was obtained a furnace black having properties in rubber comparable to the easy processing channel black. Furthermore, the furnace black from said Run 4 was easy to process or incorporate into the rubber. Run 7, using only 15 parts per million by weight of potassium chloride, was also made in accordance with the invention and shows that for a residence time in the reaction section of 5.6 times that necessary to produce a 90 photelometer black, somewhere between 15 and 20, preferably about 25 parts, per million by weight of potassium chloride would be required to produce a carbon black having essentially the same modulus value as the easy processing channel black.

Including Run 3 in the comparison of the above runs shows that increasing the residence time only will not yield a furnace black having properties in rubber comparable to those of the easy processing channel black unless the residence time is increased to impractical limits. Runs 5 and 6 were made to more clearly show the effect of only increasing the residence time. In these runs the residence time in the reaction section was increased by decreasing the oil feed rate. In Run 5 the yield decreased to 2.81 pounds of black per gallon of oil feedstock and in Run 6 the yield decreased to 2.30 pounds of black per gallon of feedstock, showing that effecting the quality control or modification of the black properties in rubber by only increasing the residence time is not practical.

The above-described aromatic concentrate oils of the example represent one presently preferred feedstock for use in the practice of the invention. However, conventional aromatic oils used in the production of furnace carbon blacks can include oils other than extract oils produced by liquid sulfur dioxide extraction of cycle oils. Typical properties of conventional aromatic oils are: boiling range 400–1000° F., BMCI 75 to 130, and an API gravity of from about 0 to about 20°.

The invention is not to be limited to the use of such aromatic concentrate oils. Other oils, such as kerosene, gasoline boiling range hydrocarbons, heavy or light naphthas or oils even heavier than recycle gas oils can be used. Such hydrocarbon materials as natural gas, either dry gas, wet or raw natural gas as it comes from a gas well, or gasoline extraction plant or refinery residue gas can be used. Further, hydrocarbons heavier than said gases can be used as charge, such as butane, pentane or the like. Broadly, most any hydrocarbon can be used as feed in my process. The feed can be injected as a liquid through a spray or atomizer, although I prefer to operate with the feed injected as a vapor. Hydrocarbons from other sources than petroleum likewise are suitable, as for example, low temperature coal gas, coal tar distillates, shale gases and distillates can be used. These charge stocks may contain most any class of hydrocarbon compound, as for example, saturated or unsaturated hydrocarbons, paraffins, olefins, aromatics, naphthenes or any others which might become available.

While it is not intended to limit the invention to any theory of operation, it is presently believed that the effect of the alkali metal additive in decreasing the modulus properties of the carbon black is due to some modification of the carbon black forming reaction itself which results in the additive being retained in or on the carbon black product. It has been noted that said additive must be present during the carbon black forming reaction. Introduction of said additive at the downstream end of the reaction zone results in little, if any, effect on the carbon black product. It is presently believed that the action of the additive is due, in some way not presently known, to the presence of alkali metal ions in the reaction section of the furnace during the formation of the carbon black. It has been noted that the nature of the anionic portion, in the case of inorganic compounds, or of the organic portion, in the case of organic compounds, is of secondary importance. Thus, the alkali metal itself, in some active form during the formation of the carbon black product, appears to be the active additive of the invention.

Similarly, the effect of increasing the residence time when employed in combination with forming the furnace black in the presence of a substance comprising an alkali metal, as in the practice of the invention, is not completely understood at this time. It may be that the presence of the alkali metal in ionic or some other form catalyzes the effect of the carbon dioxide and water vapor in the combustion gases on the carbon black product and thus changes the curing characteristics of said carbon black product. In any event, comparing Runs 2, 3, and 4 with Run 1 shows that the combined effect of the two major steps of the invention on the modulus properties is greater in Run 4 where both of said steps were used than the sum of the effect of said steps as used individually in Runs 2 and 3.

The BMCI correlation index referred to is a correlation index developed by the United States Bureau of Mines and is employed to denote aromaticity of an oil; a higher numerical index denoting a more aromatic oil. The index is calculated from the formula $$C.I. = \frac{48640}{K} + 473.7G - 456.8$$

where:

C.I.=Bureau of Mines correlation index
K=Average boiling point (° K.)
G=Specific gravity @ 60° F./60° F.

Oil absorption is measured by adding oil a few drops at a time to a one gram sample of carbon black on a mixing stone or glass plate. After each addition the oil is incorporated thoroughly with a spatula, using moderate pressure. Tiny pellets are formed, gradually increasing in size as more oil is added. The end point, approached one drop of oil at a time, is reached when a single ball of stiff paste is formed. The results are reported as cc. oil per gram of black, or converted to gallons of oil per 100 pounds of black.

The photelometer test is a measure of the tar content and thus a measure of the quality of the carbon black product. The tar content of carbon black is determined by mixing 2 grams of black with 50 cc. of chloroform, boiling the mixture, filtering, and determining the percentage light transmittance of the filtrate as compared with the transmittance of a blank sample of chloroform. The comparison is preferably conducted with a photoelectric colorimeter such as a Lumetron colorimeter at a wave length of 440 mu, a light intensity of 20, and a cell 1 cm. long. A tar-free black is arbitrarily defined as one that shows in tests on samples taken after pelleting a transmittance greater than 85 per cent according to this procedure. Pelleting the flocculent black (not disclosed) by the conventional processes raises the photelometer number 5 points, or more, from 80 to 85 for example. Acetone is sometimes substituted for chloroform in the test procedure. The percent transmittance equivalent to 85% with chloroform is about 92% with acetone. The original acetone or chloroform used for the test should be substantially colorless. When the term "photelometer" is used without naming the solvent, the convention in the art is that chloroform is the solvent employed.

In the above tables the term "300 percent modulus, p.s.i." refers to the pounds per square inch pull in a tension test when the test piece of vulcanized rubber has been stretched 300 percent of the length of the original test piece. The term "tensile p.s.i." represents the pounds per square inch pull at the point of rupture or break of the test piece undergoing the above-mentioned 300 percent modulus test. The term "elongation" represents the stretch or elongation at the point of break. All of said tests are determined in accordance with ASTM D-412-51T, and are carried out at 80° F. unless otherwise designated.

"Cross-linking" is determined from the reciprocal volume swell and equilibrium modulus as described by P. J. Flory, J. Rehner, Jr., Journal of Chemical Physics, 11, 521 (1943) and P. J. Flory, Ibid., 18, 108 (1950).

"Compounded Mooney, ML-4, 212° F." is determined according to ASTM-D-927-57T, using a Mooney viscometer, large rotor, 4 minutes, unless otherwise noted.

The invention is not to be limited to any particular furnace operating conditions. Any suitable conditions can be employed. In general, the temperature within the combustion section will be within the range of 2300 to 3100° F., the temperature within the reaction section will be within the range of 2500 to 3000° F., the volume ratio of tangential air to tangential gas will be within the range of 6.6 to 20, and the oil preheat temperature will be within the range of 300 to 850° F. depending upon whether the oil is introduced as a liquid or vapor. Other suitable operating conditions outside these ranges can be used in the production of specific carbon blacks having specific properties.

While the invention has been described and illustrated in the examples with particular reference to using the carbon blacks of the invention in natural rubber, the invention is not so limited. Carbon blacks produced in accordance with the invention can also be compounded into the various synthetic rubbers where desired.

Also, while the invention has been particularly described and illustrated with reference to employing a precombustion type of tangential flame furnace and process, the invention is not so limited. The invention can also be carried out in other tangential flame furnaces such as those described in the above-mentioned patents and other types of furnaces and processes for making furnace carbon black.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. A process for producing a furnace carbon black product characterized by desired lower than normal modulus properties in rubber, which process comprises:
   charging a hydrocarbon feedstock to a carbon black producing furnace;
   producing carbon black by partially burning said feedstock under carbon black producing conditions in the reaction zone of said furnace in the presence of a substance comprising an alkali metal present in an amount within the range of from 1 to 200 parts by weight of potassium per million parts by weight of said feedstock and which is sufficient to effect only from about 25 percent to not more than about 75 percent of said desired decrease in modulus properties;
   maintaining said thus produced carbon black in said reaction zone under said carbon black producing conditions for an increased period of time which is longer than that necessary to produce a tar-free carbon black having a photelometer value of 100 and which is sufficient to effect the remainder of said desired decrease in moduls properties; and
   recovering said carbon black product from the effluent from said furnace.

2. A process for producing a modified furnace carbon black product characterized by lower than normal modulus properties in rubber, which process comprises:
   charging to a carbon black producing furnace a hydrocarbon feedstock containing a substance comprising an alkali metal present in an amount sufficient to effect only a portion of the desired decrease in modulus properties;
   partially burning said feedstock under carbon black producing conditions in the reaction zone of said furnace in the presence of said alkali metal to produce carbon black;
   maintaining said thus produced carbon black in said reaction zone under said conditions for an increased period of time which is longer than that necessary to produce a tar-free carbon black having a photelometer value of 100 and which is sufficient to effect the remainder of said desired decrease in modulus properties; and
   recovering said modified carbon black product from the effluent from said furnace.

3. In a process for the production of a furnace carbon black having lower than normal modulus properties in rubber, said carbon black being produced from a hydrocarbon feedstock which would normally yield a carbon black having at least normal modulus properties in rubber, wherein the desired decrease in modulus properties of said carbon black is obtained by forming said carbon black from said feedstock in a carbon black furnace under carbon black producing conditions in the presence of an amount of a substance comprising an alkali metal which is sufficient to effect all of said desired decrease in modulus properties, and wherein the carbon black product so produced is maintained in the reaction section of said furnace for a period of time which is only sufficient to obtain a substantially tar-free carbon black, the improvement comprising:
   partially burning said feedstock in a carbon black producing furnace under carbon black producing conditions in the presence of a reduced amount of said alkali metal sufficient to only partially effect said desired decrease in modulus properties of the carbon black produced;
   maintaining said thus produced carbon black in the reaction section of said furnace for an increased period of time which is longer than that necessary to produce a tar-free carbon black having a photelometer valve of 100 and which is sufficient to effect the remainder of said desired decrease in modulus properties; and
   recovering an improved easy processing carbon black having lower than normal modulus properties from the effluent from said furnace.

4. A process according to claim 3 wherein said substance comprising an alkali metal is a chemical compound and is present in an amount sufficient to effect from at least about 25 percent to not more than about 75 percent of said desired decrease in modulus properties.

5. A process according to claim 3 wherein said substance comprising an alkali metal is potassium chloride and is dispersed in said hydrocarbon feedstock in the form of an aqueous solution in an amount within the range of from 2 to 100 parts by weight based on potassium per million parts by weight of said feedstock.

6. A process according to claim 3 wherein said thus produced carbon black is maintained in said reaction section for a period of time within the range of from 1.5 to 9 times the period of time necessary to produce a tar-free carbon black.

7. A process according to claim 3 wherein said substance comprising an alkali metal is a compound of potassium, is present in said reaction section in an amount within the range of from 2 to 100 parts by weight based on potassium per million parts by weight of said feedstock, and said thus produced carbon black is maintained in said reaction section for a period of time within the range of from 2 to 6 times the period of time necessary to produce a tar-free carbon black.

8. In a process for producing carbon black having desired lower than normal modulus properties in rubber, which process comprises the steps of, introducing a hydrocarbon feedstock into a carbon black producing furnace, introducing a substance comprising an alkali metal into said furnace, converting a portion of said feedstock to carbon black by a pyrochemical cracking reaction in said furnace under carbon black producing conditions in the presence of said alkali metal, cooling the effluent resulting carbon black containing gases, and separating said carbon black from said gases, and where in said process the amount of said substance comprising an alkali metal which is introduced into said furnace is sufficient to obtain the total desired decrease in said modulus properties in rubber, and also where in said process the thus produced carbon black is maintained in the reaction section of said furnace for a period of time only sufficient to produce a substantially tar-free carbon black, the improvement comprising:

introducing into said furnace a reduced amount of said substance comprising an alkali metal which is sufficient to effect only a portion of said desired decrease in modulus properties in rubber; and maintaining the thus produced carbon black in the reaction section of said furnace for an increased period of time which is longer than that necessary to produce a tar-free carbon black having a photelometer value of 100 and which is sufficient to obtain the remainder of said desired decrease in modulus properties.

9. In a process for producing a furnace carbon black having desired lower than normal modulus properties in rubber, which process comprises: continuously introducing fuel and free oxygen containing gas tangentially into a first cylindrical zone having a diameter greater than its length, passing the resulting gases spirally inward toward the longitudinal axis of said first zone, continuously passing said gases while so rotating into a second cylindrical zone the length of which is greater than its diameter and the diameter of which is less than that of said first zone, said second zone being in communication with and in axial alignment with said first zone whereby a helical movement of said gases is provided along the inner surface of said second zone, introducing a vaporous hydrocarbon along the axis of said first zone and passing it axially through the center of said inwardly spiraling gases in said first zone and axially into the center of said helically moving gases in said second zone, burning said fuel with said free oxygen containing gas and substantially completing the combustion of said fuel before said inwardly spiraling resulting gases contact said axially passing vaporous hydrocarbon to maintain a temperature above approximately 2300° F. in said first cylindrical zone, forming carbon black from said vaporous hydrocarbon by pyrochemical action due to the heat of the surrounding hot combustion gases without the further addition of any substantial amount of air, and separating said carbon black from the resultant gaseous products of said process, and where in said process there is also introduced into said second zone a substance comprising an alkali metal in an amount which is sufficient to obtain the total desired decrease in said modulus properties in rubber, and also where in said process the thus produced carbon black is maintained in the reaction section of said furnace for a period of time only sufficient to produce a substantially tar-free carbon black, the improvement comprising:

introducing into said furnace a reduced amount of said substance comprising an alkali metal which is sufficient to effect only a portion of said desired decrease in modulus properties in rubber; and maintaining the thus produced carbon black in the reaction section of said furnace for an increased period of time which is longer than that necessary to produce a tar-free carbon black having a photelometer value of 100 and which is sufficient to obtain the remainder of said desired decrease in modulus properties.

References Cited by the Examiner

UNITED STATES PATENTS

| | | | |
|---|---|---|---|
| 2,440,424 | 4/1948 | Wiegand et al. | 23—209.4 |
| 2,780,529 | 2/1957 | Wrigley | 23—209.4 |
| 2,865,717 | 12/1958 | Krejci | 23—209.4 |
| 2,961,300 | 11/1960 | Dollinger | 23—209.4 |
| 2,971,822 | 2/1961 | Williams | 23—209.4 |
| 3,010,794 | 11/1961 | Friauf et al. | 23—209.4 |
| 3,010,795 | 11/1961 | Friauf et al. | 23—209.4 |
| 3,011,872 | 12/1961 | Webster | 23—209.4 |
| 3,046,096 | 7/1962 | Heller et al. | 23—209.4 |

OSCAR R. VERTIZ, *Primary Examiner.*

MAURICE A. BRINDISI, *Examiner.*

A. J. STEWART, E. J. MEROS, *Assistant Examiners.*